July 15, 1947.  G. W. BLESSING  2,423,869
COMPOSITE STRUCTURE AND METHOD OF MAKING THE SAME
Filed Sept. 30, 1940  4 Sheets-Sheet 1
Fig.1.
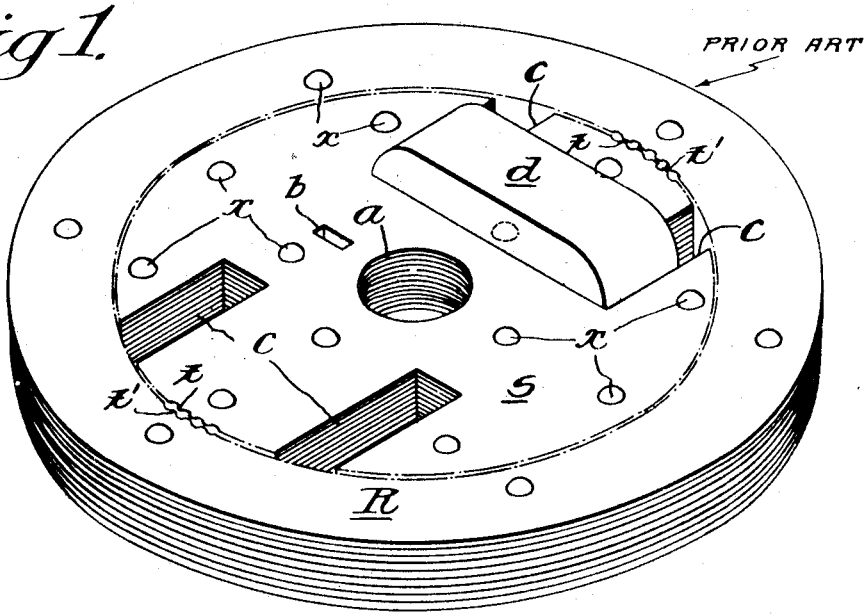
Fig.2.
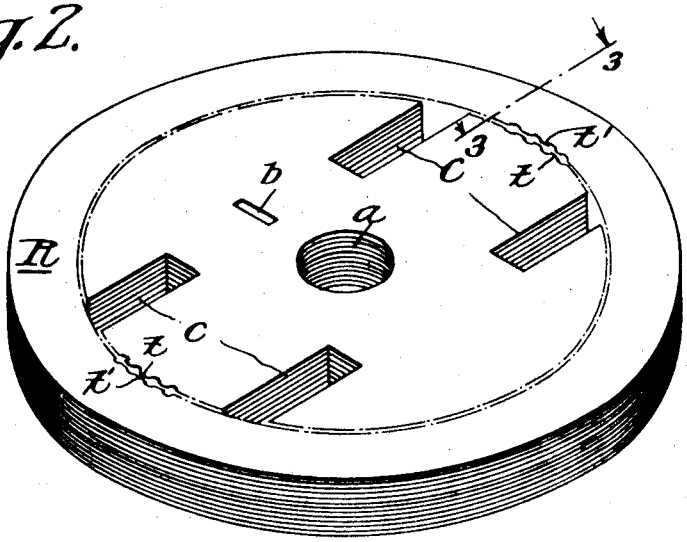
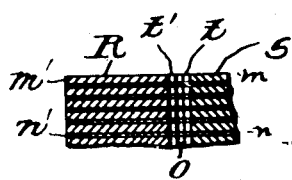
Fig.3.
Inventor
Gregory W. Blessing
By
Attorney July 15, 1947.　　　　G. W. BLESSING　　　　2,423,869
COMPOSITE STRUCTURE AND METHOD OF MAKING THE SAME
Filed Sept. 30, 1940　　　　4 Sheets-Sheet 2
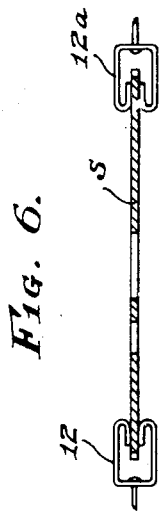
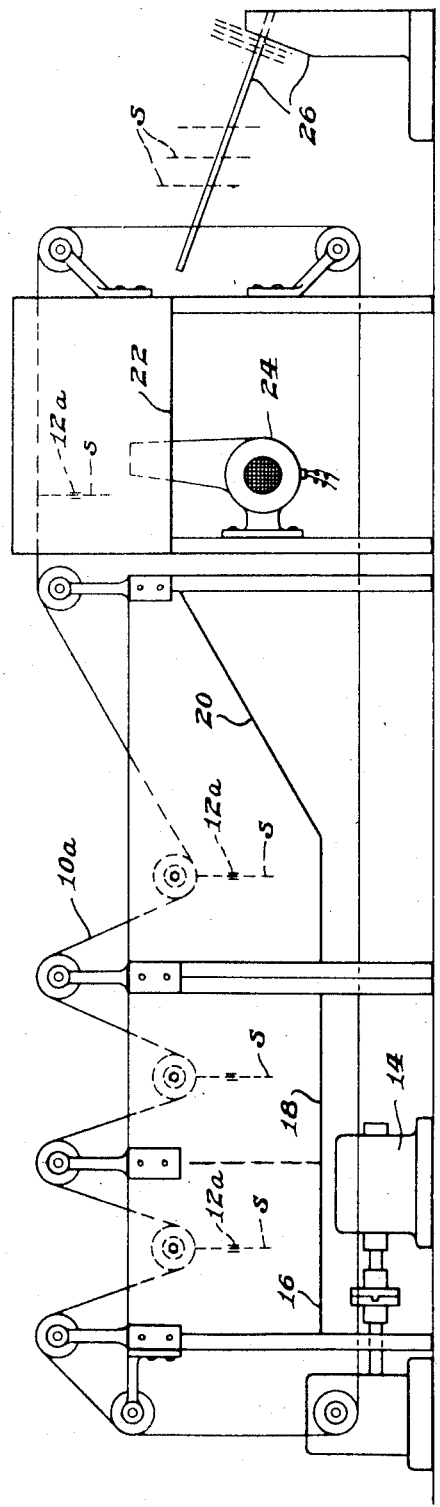
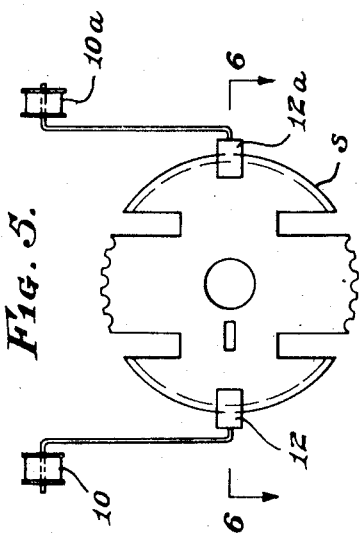
Inventor
Gregory W. Blessing
By
Attorney July 15, 1947.  G. W. BLESSING  2,423,869
COMPOSITE STRUCTURE AND METHOD OF MAKING THE SAME
Filed Sept. 30, 1940  4 Sheets-Sheet 3
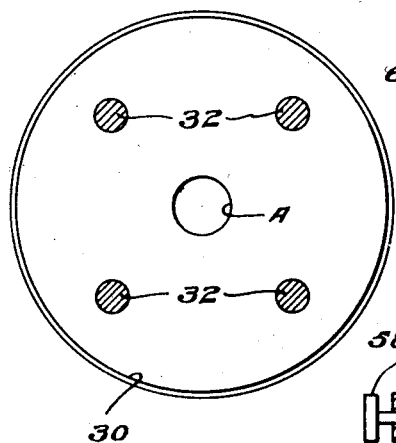
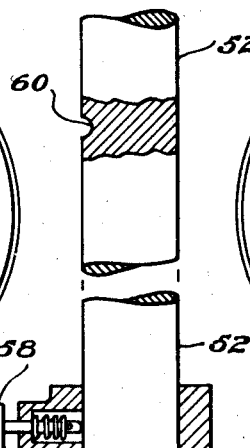
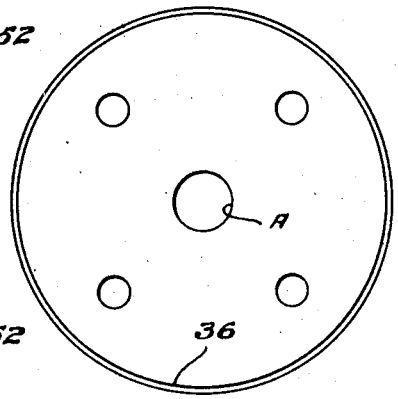
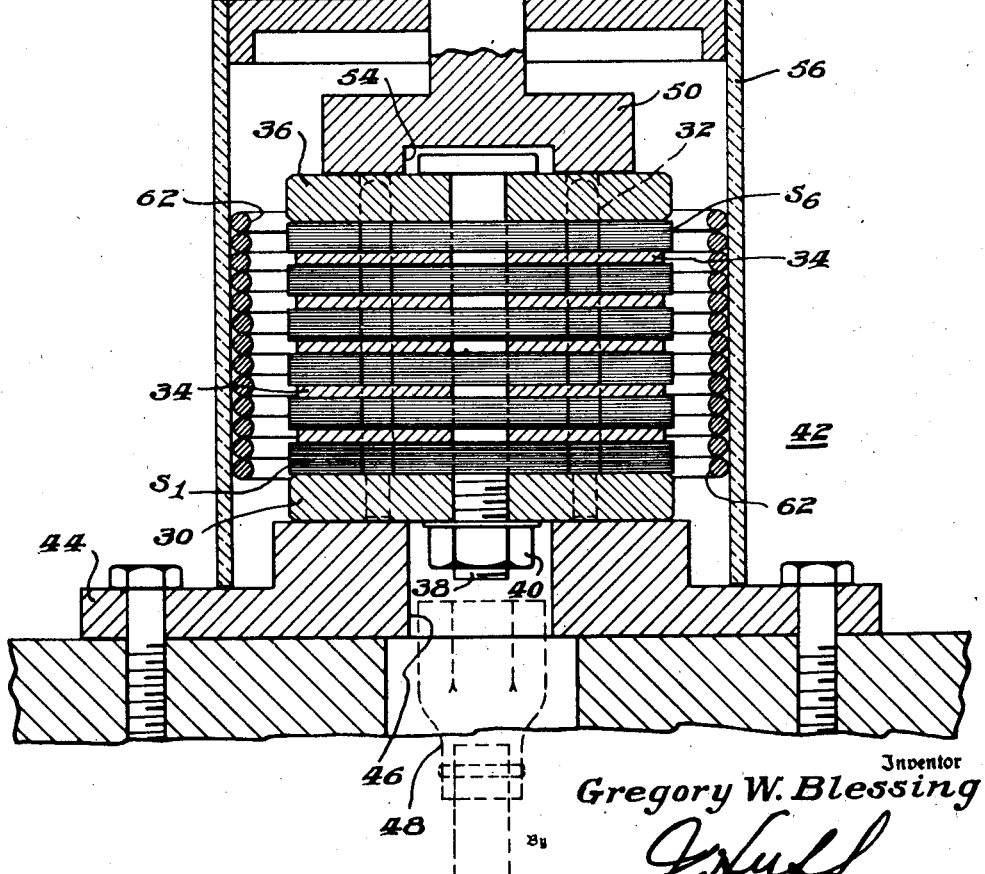
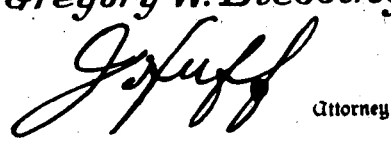
Inventor
Gregory W. Blessing
Attorney July 15, 1947.　　　G. W. BLESSING　　　2,423,869
COMPOSITE STRUCTURE AND METHOD OF MAKING THE SAME
Filed Sept. 30, 1940　　　4 Sheets-Sheet 4
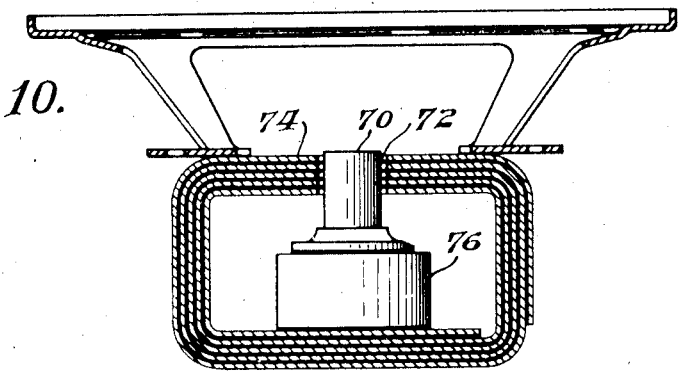
Fig. 10.
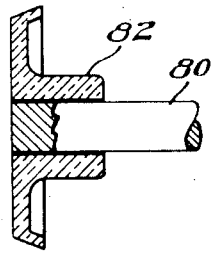
Fig. 11.
Fig. 12.
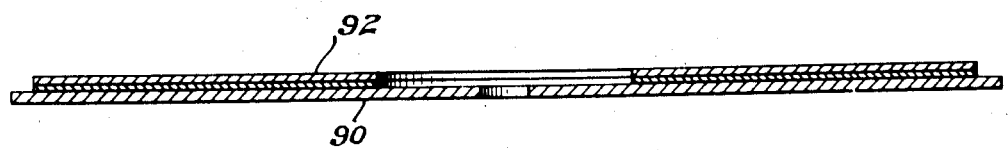
Fig. 13.
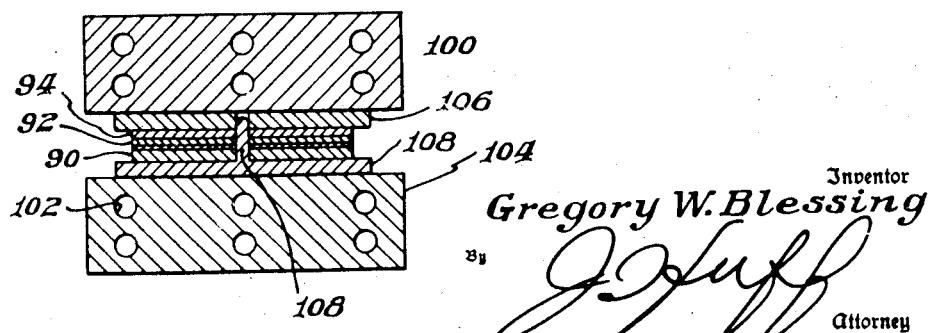
Inventor
Gregory W. Blessing
By
Attorney Patented July 15, 1947

2,423,869

UNITED STATES PATENT OFFICE 2,423,869

COMPOSITE STRUCTURE AND METHOD OF MAKING THE SAME

Gregory W. Blessing, Moorestown, N. J., assignor to Radio Corporation of America, a corporation of Delaware Application September 30, 1940, Serial No. 359,129

19 Claims. (Cl. 154—129)

This case is a continuation in part of application Serial No. 187,969, filed January 31, 1938.

This invention relates to composite structures and to methods of making the same.

The prior art is replete with disclosures relating to the bonding of separate materials or parts into temporary or more or less fragile composite structures by means of synthetic resinous materials. By way of example, it has hitherto been proposed to form shim stock from thin metal and to cause metal foil to adhere to metal or to glass by the use of various thermosetting and thermoplastic bonding materials. In cases where the composite structures of the prior art have been called upon to meet stresses and strains of appreciable magnitude, thermoplastic bonding materials have been used merely for holding the several parts together during their assembly, i. e., prior to the application of more rigid bonds, such for example, as rivets, bolts, clamps, or solid embedments. Thus, irrespective of the advantages claimed for prior art methods of uniting separate parts by the use of synthetic resinous materials it may be said that the resultant bonds have in no case been sufficiently strong to warrant the use of such adhesives as the sole bond in composite metal structures of the type (e. g., machine parts) normally subjected to substantial mechanical stresses and strains.

It is accordingly an object of the present invention to provide a composite metal structure wherein the parts are united in rigid, and strong, permanent relation by means of a synthetic resinous material and without the use of screws, rivets, bolts, solder, welds, embedments or other auxiliary clamps or bonds.

A related object of the invention is to provide a composite metal structure which shall have the "ring" of solid metal and which shall possess a strength that compares favorably with that achieved by actual fusion of the surfaces of its parts.

Another object of the invention is to provide a simple, economical and trouble free method of manufacturing composite metal articles.

Another object of the invention is to provide a laminated magnetic structure of higher permeance and greater resistance to eddy current and "shorted-turn" losses than prior art structures of the same general design, whereby a given amount of work may be accomplished by means of a structure constituted of fewer and smaller laminae.

Another object of the invention is to provide a laminated magnetic structure which, by reason of its ease of assembly and its simplicity and economy of parts, lends itself readily to mass production methods.

Another object of the invention is to provide an improved method of manufacturing laminated magnetic structures of irregular contour, said method permitting pre-fabrication of the individual magnetic laminae in the desired ultimate shape of the finished structure, instead of requiring cutting or trimming operation on the assembled laminae.

Still another object of the invention is to provide a novel method of uniting magnetic and/or magnetic and non-magnetic metals into a strong composite structure without undue sacrifice in the magnetic characteristics of the said metal or metals.

The foregoing and other objects are achieved in accordance with the present invention by subjecting a synthetic resinous material, preferably a thermoplastic, to partial pyrolysis or thermal decomposition prior to or during the bonding operation. Thus, whereas the prior art dictates the application of but sufficient heat to render the bonding material tacky, or soft, or fluid, and to drive out the solvent material, the present invention contemplates the use of bonding materials which have been freed or substantially freed from solvents prior to the bonding operation, and, further, teaches the use of temperatures and/or pressures greatly in excess of that required to render such materials fluid, yet not so great as to cause complete pyrolysis of said material.

The usual thermoplastic materials have softening points ranging from, say, 100° C. to, say, 160° C. (the addition of fillers may raise the melting point), and bonds of the ordinary strength, provided by prior art methods, may be obtained, substantially irrespective of the pressure applied, at temperatures slightly above the softening point.

In the process of the present invention there may be said to be a definite relation between temperature, time of temperature and, to some degree, pressure applied. Thus, in forming some composite structures in accordance with the invention it has been found that a temperature of 200° C. applied for a period of, say, ten minutes, provides a bond of high strength and that a temperature of, say, 300° C. applied for a period of but two minutes affords an equally strong bond. As a general rule the pressure to be applied varies inversely (but not proportionately) with respect to the applied temperature. In all cases, however, the thermoplastic material changes color just below its decomposition point, and this affords a satisfactory indication of the proper time to remove the structure away from the source of heat. This point is reached in the usually colorless thermoplastic materials and also in those to which an aniline dye has been added (to enable the operator to distinguish between coated and uncoated parts, or to give an indication of the relative thickness of the applied coating) when the material presents a "scorched appearance" or assumes a brownish or straw colored hue.

The removal of rust or scale and of oil and other hydrocarbons from the parts to be joined is essential to the achievement of bonds of extremely high strength. Care must be taken to ensure a thorough cleansing of metal parts, as otherwise the bonding material will adhere to the surface "scale" instead of to the main body of the metal. The removal of such scale is believed to leave minute indentations or "pores" in the surface of the metal into which the bonding material enters and becomes anchored. That this is so has been evidenced in tests where, in attempting to destroy the bond, fragments of the metal continued to adhere to the bonding material after the structure had been pulled apart by the relatively enormous force of the testing apparatus.

The cleansing technique to be employed in a given case may be determined by a study, under magnification, of the surfaces which are to be subjected to the bonding operation. By way of example, metal parts having some loose surface scale, and/or a substantial deposit of oil or the like may be cleansed with acid, e. g., the phosphoric acid treatment hereinafter more fully described. Ordinary vapor (trichloroethylene or similar solvent) degreasing methods may be employed when the scale or other foreign matter is present merely in readily removable quantities. In order to bond polished metals, such, for example, as the high content nickel alloys, stainless steel and similar alloys, it is desirable that the surfaces to be joined be first etched, chemically (e. g., as by a "flash" treatment with aqua regia) or electrolytically, or otherwise, to provide the desired "anchorage" for the bonding material.

An exhaustive study of the presently known thermoplastic compounds indicates that not all of them lend themselves to the practice of the invention. Excellent results, however, have been achieved with polyvinyl acetate, especially "hydrolyzed" polyvinyl acetate. The latter material is available from the Union Carbide and Carbon Chemicals Corporation under the grade mark XL5075 and is understood to comprise 28% by weight solution of polyvinyl acetate in methyl acetate. Excellent results have also been achieved with the "Glyptal" resins.

"Glyptal" is the trade name used by the General Electric Company to designate a patented (U. S. P. 1,108,329 and 1,634,969) class of synthetic resins made from glycerin and phthalic acid or phthalic anhydride, of which the thermoplastic compound known by the grade mark ZV5057 is a specific example. The coating applied to the parts to be united should be thick enough to prevent the formation of holes when the material is subjected to the drying operation, and yet thin enough to ensure rapid and uniform transfer of heat between the parts to be bonded. These requirements are usually met in coatings of a thickness of the order of from, say, .005" to .001".

It is preferable to apply the bonding material to the surfaces to be joined as soon after the cleansing operation as possible. The thermoplastic bonding materials specifically mentioned above may be applied to the parts either (a) in the form of a coating (in which case the material may be diluted with a suitable solvent free from oil or other contamination) and then dried, or (b) in the form of a separate dry sheet or film placed between the surfaces to be bonded.

The type of heat employed in carrying the invention into effect will ordinarily be dictated by the nature of the parts to be joined. The rapidity with which induced heat (e. g., from an induction furnace employing either low, high or ultra high frequencies) may be applied, recommends its use in cases wherein the shape of the parts permits. Convected heat (e. g., from a muffle type furnace) may be used on irregular or odd shaped objects, if desired. Conducted heat may be applied to shaft-mounted parts such as drums, hubs, pulleys, gears, knobs, etc. Heat radiated from an infra-red source is preferably employed for bonding parts requiring focused heat.

While the invention will be described as applied to the manufacture of the laminated rotor and stator elements of a so-called "reactance type" motor, and to certain other magnetic and non-magnetic composite structures, it is to be understood that the invention is not limited to the particular applications which have been here selected for purposes of explaining the inventive concept.

In the drawings—

Figure 1 is a view in perspective showing so much of the magnetic structure of a conventional reactance type motor as is necessary to a clear understanding of one of the problems with which the present invention is concerned;

Figure 2 is a view in perspective of a laminated rotor and a laminated stator element designed and constructed in accordance with the principle of the present invention and capable of performing the work of the larger, heavier and costlier motor parts of Fig. 1;

Figure 3 is a fragmentary sectional view taken on the line 3—3 of the laminated magnetic elements of Fig. 2;

Figure 4 is a partly diagrammatic elevational view of certain apparatus which may be employed in manufacturing laminated structures in accordance with the improved method of the invention;

Figure 5 is a view in perspective of a prefabricated, toothed, rotor lamina supported for treatment in the apparatus of Fig. 4;

Figure 6 is a sectional view taken on the line 6—6 of Fig. 5;

Figure 7 is a plan view of a jig upon which the rotor laminae may be assembled;

Figure 8 is a plan view of a top plate of the jig of Fig. 7;

Figure 9 is a partly broken-away view of a press, with several stacks of rotor laminae assembled on the jig of Figs. 5 and 6 and in position to be subjected to a compressional force.

Figure 10 is a side elevational view partly in section showing the invention as applied to various parts of a loudspeaker;

Figure 11 is a sectional view of a shaft-end having a knob or pulley affixed thereto in the manner taught by the invention;

Figure 12 is a sectional view of a phonograph record matrix having a backing plate bonded thereto in accordance with the method of the invention; and Figure 13 is a sectional view of a press adapted for uniting the matrix shell and backing plate of Fig. 12.

Like reference characters designate the same or corresponding parts in Figs. 1 to 9 inclusive.

Because of their constant speed characteristic, reactance type motors find useful application, by way of example, in the electric phonograph art where they are commonly employed for driving record-playing turntables. In Fig. 1, S designates a laminated circular stator plate, and R is a laminated annular rotor element surrounding the stator. The stator plate is provided with a central orifice $a$ to accommodate a bearing (not shown), a second, preferably rectangular orifice $b$ through which a damper spring (not shown) may project, and a plurality of inwardly extending, parallelly-arranged, aligned, cut-away portions $c$ within which suitable energizing coils, exemplified by coil $d$ may be seated. The non-cutaway portion of the periphery of the stator S, and the entire inner periphery of the annular rotor element R are provided with noninterlocking sets of teeth $t$, $t'$, respectively, which constitute the spaced pole pieces of the motor. The exact number of teeth with which each element is provided will ordinarily be determined in accordance with a known formula by (1) the frequency of the energizing current, and (2) the desired speed of the rotor.

The prior art method of manufacturing the laminated rotor R and stator S of Fig. 1 comprises starting with separate smooth-edged (i. e., non-toothed) metal blanks in which the orifices $a$, $b$ and slots $c$ have been cut, as by a stamping operation; the stacking and clamping of the blanks on a suitable frame (not shown); and then fastening the blanks in the respective stacks together as by means of numerous rivets $x$. Subsequent to the riveting operation, the teeth $t$ are cut in the peripheral edges of the otherwise finished laminated stacks. Considered from the standpoint of manufacturing convenience and economy, it would, obviously, be advantageous to cut the teeth in the same stamping operation in which orifices $a$, $b$ and slots $c$ are formed. It will be apparent, however, to those skilled in the art that, since it is practically impossible to maintain an equal distribution of the clamping force by means of rivets, the teeth of such prefabricated blanks would not be held in the required perfect alignment.

The use of rivets, screws, and bolts in laminated magnetic structures is objectionable, not only from the standpoint of manufacturing economy, but also from the standpoint of electrical and magnetic efficiency. By way of example, such auxiliary clamping elements, by their very presence in a magnetic structure, establish "shorted turns" or "loops" with attendant eddy current and conductivity losses. Considered from another aspect, rivets and the like produce unsymmetrical variations in the path of the magnetic flux so that the magnetic permeance of the structure is less uniform than is desirable. Further, disturbing "hums" in motors having rotor and stator elements constructed in the manner shown in Fig. 1, have been traced to a slight mechanical separation of adjacent laminae due to "buckling" in the areas between the rivets.

The above-described and other less apparent objections to laminated magnetic structures of the prior art are substantially obviated, in accordance with the present invention, by the provision of a structure comprising alternate metal and thermoplastic layers intimately bonded one to another. The thermoplastic may be composed of an insulating polymerizable or non-polymerizable material and in any event is preferably subjected, in accordance with the present invention, to partial pyrolysis or thermal decomposition during the bonding operation.

Figs. 2 and 3 show the same assembly of motor parts shown in Fig. 1, but with the respective laminated parts constructed in accordance with the principle of the present invention. Here, as in Fig. 1, the laminated rotor structure is designated R and the circular stator structure S. As before, the stator is provided with a central bearing orifice $a$, a rectangular spring-retaining orifice $b$, and a plurality of coil-retaining slots $c$. Both the rotor and stator are provided with pole pieces comprising series of teeth $t'$, $t$, respectively, on their adjacent peripheral edges. In Fig. 3, the metal and insulating layers of the rotor element R are designated $m'$, $n'$, respectively; $t'$ is a portion of a rotor tooth, and $o$ marks the space between tooth $t'$ and adjacent tooth $t$ on the metal and insulating laminae $m$, $n$, respectively, of the stator element S.

It will be observed from a comparison of Figs. 1 and 2 that the laminated parts constituting the device of Fig. 2 are of a smaller overall diameter and comprise fewer laminae than the corresponding parts of the device of Fig. 1. It was found, by way of example, that when an assembly of riveted rotor and riveted stator elements similar to that shown in Fig. 1 was embodied in a reactance type phonograph motor, it was necessary to employ sixteen silicon steel laminae .025 inch thick (in each element) and having an overall diameter of 5½ inches, in order to develop a torque of approximately 6 inch-ounces when energized with 60-cycle, 100-volt current. The same result was achieved with the assembly of Fig. 2 when the overall diameter was 4½ inches and with but 12 silicon steel laminae each .025 inch thick. Further, the power factor efficiency (watts consumed for power delivered) was greater by 10 percent when the rotor-stator assembly (Fig. 2) of the invention was employed.

Because the method preferably employed in treating the metal and assembling the separate laminae is substantially the same irrespective of the size or contour of the finished structure, reference will be made only to the treatment of the parts constituting the stator structure S of Fig. 2. In this case, the first step consists in stamping the laminae or "blanks" from iron, silicon steel, or other suitable magnetic metal sheets of the desired thickness (in this case .025"). The stamping machine, not shown, was equipped with a die designed to provide the individual blanks with the slots $c$, orifices $a$, $b$ and teeth $t$ corresponding to those shown in the finished stator structure of Fig. 2. These prefabricated blanks are preferably subjected to a bath in a medium, such, for example, as phosphoric acid, which attacks the scale and grease on the metal. The blanks are next rinsed in a bath of "soft" water, to remove all traces of the acid residue and are then dried prior to being provided with a coating of a suitable hydrolyzed polyvinyl acetate, or other suitable bonding material. The coating material is then thoroughly dried to remove all traces of the solvent which might give rise to "bubbles" in the subsequent bonding operation. The blanks may be stored in the dry state prior to being bonded in the ultimate form shown in Fig. 2.

As previously pointed out the acid bath and rinsing operations are usually necessary only in the event that surface scale is present in substantial quantities. Degreasing methods employing trichloroethylene or similar solvents may be employed in the event that under magnification, the surfaces of the metal reveal but little scale and exhibit the desired surface porosity.

The cleansing, drying, coating, re-drying, and storing operations may be accomplished automatically, for example, by means of the apparatus of Figs. 4 and 5.

Referring to Figs. 4, 5 and 6, 10, 10a designate a pair of parallel chains to which the pre-fabricated stator blanks s are affixed as by means of dependent spring clips 12, 12a which are mounted at opposite points and at suitable intervals along the chains. The chains are driven in synchronism as by a motor 14 over an endless path which embraces a tank 16 containing phosphoric acid, a tank 18 containing a rinsing fluid, a tank 20 containing the thermoplastic in a fluid or semi-fluid condition, a drying oven 22 which may be heated as by a blower 24 and finally an unloading or stripping frame 26. Obviously, a spraying chamber may be substituted for the coating tank 20, if desired.

A drying oven, not shown, may be provided intermediate the rinsing tank 18 and the coating tank 20 in instances where the spacing between these tanks is insufficient to ensure drying of the blanks by exposure to room temperatures. Where the original surface condition of the parts indicates the use of trichloroethylene, or similar cleansing agent, in vapor form, as the degreasing agent, the rinsing tank 18 may contain the same material in the form of a liquid.

The discrete, dried blanks s may be stored on the removable frame or arbor of the stripping device 26 (Fig. 4) prior to being assembled in undivided stacks of the number (twelve in this case) required to form the finished stator structure S of Fig. 2.

Referring now to Figs. 7 to 9, inclusive, which show apparatus which may conveniently be employed in assembling and bonding the several blanks s, in these figures, 30 designates the base and 32 the "pins" of a jig upon which the coated blanks are assembled. The upstanding pins 32 are so dimensioned and positioned as to fit snugly in the slots of the individual blanks. They are preferably long enough to accommodate several stacks S1 to S6 (see Fig. 9) spaced one from another by removable inserts 34, which are preferably formed of a non-magnetizable metal such as beryllium-copper.

When the several stacks have been assembled on the jig, a top plate 36 is placed on the uppermost stack S6, a bolt 38 is inserted in the central orifice A which extends through the entire assembly and a nut 40 placed on the threaded end of the bolt. Preferably the several parts 30, 32, 36 and 38 of the jig are made of the same metal as the spacers 34.

With the several stacks assembled on the jig in the manner above described, the loaded jig is placed in a press 42, the bed or platen 44 of which is provided with an orifice 46 through which access may be had to the nut 40 by means of a wrench 48. The head 50 of the plunger 52 of the press is cut away at 54 to accommodate the head of the bolt 38.

A hood 56 slidably mounted on the plunger shaft 52 surrounds the head and platen of the press when the stack assembly is in position under the head. This hood is adapted to be maintained in its raised position, to permit insertion of the stack assembly, as by means of a spring-actuated pin 58 which is adapted to engage a detent 60 in the plunger shaft.

Mounted within the hood is a coil 62 adapted to be connected to a source (not shown) of high frequency, high amperage current. This coil operates on the principle of an induction furnace to heat the stack assembly to a temperature (say 200°–300° C.) greatly in excess of that required to render the thermoplastic material fluid, yet not so great or for so long a duration as to cause complete pyrolysis of the said material. The compressing or bonding force may be exerted upon the stack assembly as by means of the plunger 52 either during or subsequent to the moment that the coats or layers of bonding material are rendered fluid. The force exerted by the plunger may be of the order of 100 to 1000 lbs., per square inch of stack surface to ensure the previously described penetration of the surfaces of the metal laminae with the thermoplastic bonding material. The pressure employed is not critical, though it may vary inversely with the temperature employed. With the compression force maintained at the selected intensity, the nut 40 is tightened on the bolt 38 by means of the wrench 48. The hood 56 is then raised to permit removal of the jig from the press, and the stack assembly is permitted to cool under the clamping force exerted by the tightened bolt 38. After cooling, the bolt is withdrawn and the several laminated magnetic structures S removed from the jig.

Under heat and compression, some of the bonding material may exude from between the metal laminae. Where clean surfaces are required, the exudate may be removed as by buffing or grinding or by the use of solvents. In this latter connection, it may be mentioned that when a composite structure manufactured in accordance with this invention was placed in acetone, it resisted decomposition for a considerable period, whereas the same parts and same bonding material when assembled in accordance with the prior art fell apart immediately. Attention is also directed to the fact that laminated metal structures formed by the "thermoplastic fusion process" of this invention have the "ring" of solid metal, and further, may be machined, ground, drilled and tapped in a plane parallel to the bond without rupturing it.

The following advantages, not previously specifically mentioned, have resulted from the application of the present invention to the production of electric motors of the type described in connection with Figs. 1 and 2: (a) a reduction of the motor price from a little over three dollars to ninety-seven cents, (b) an increase of ten percent in motor efficiency, (c) a very material reduction in the hum incident to the operation of prior art motors of the type described, and (d) a substantial reduction in the number of rejects.

Other advantages have been achieved by the application of the invention to the production of other articles, including those requiring extreme accuracy in their assembly and the maintenance of such accuracy over long periods of operation. Referring, by way of example, to the loudspeaker assembly shown in Fig. 10, and which is claimed per se in copending application Serial No. 359,130, filed September 30, 1940, in the name of Gregory W. Blessing. In this case, the dimensional tolerance in the space between the pole piece 70 and the surface of the orifice 72 in the magnetic "yoke" 74 through which it projects has been held in practice to .0005" (five-ten-thousandths of an inch). In making this loudspeaker, the method of the present invention was applied not only to the mounting of the pole piece 70 upon the magnet 76 but also to the mounting of the magnet 76 within the yoke 74, and to the construction of this wound or wrapped yoke from a single strip of magnetic material. In construction the yoke, a clean flat metal strip which had previously been punched with the holes 72 at suitable intervals was coated with "Glyptal," dried ad then wound upon a circular mandrel, not shown, with the holes in register. The strip thus formed was removed from the mandrel and shaped on a rectangular expanding-block (which was waxed in order to prevent the formation of a permanent bond between the block and the said surface during the subsequent bonding operation). The clamping pressure necessary to the formation of the bond was applied to this structure by expanding the expanding-block against the restraining force of a clamp, not shown. The necessary heat was supplied by a muffle type furnace.

A clamp of special construction (it had a cylindrical projection for establishing the required spacing between the pole piece and the inner surface of orifice 72) was employed in bonding the pole piece 70 to the magnet 76 and the magnet to the yoke. This clamp was also provided with jaws which engaged the inner and outer surfaces of the yoke, and with a thumbscrew capable of exerting the requisite bonding force upon the exposed end of the pole piece and magnet.

The improved operating characteristics of the loudspeaker assembly of Fig. 10 are discussed in the above identified copending application. However, it may here be recorded that, in a test of the mechanical strength of this device, several hammer blows of substantial intensity were required to shatter the previously described thermoplastic bond between the magnet 76 and the yoke structure 74 whereas a single blow of similar intensity served to shatter the welded bond between the magnet and yoke in a loudspeaker of standard construction. The remarkably stronger construction of the device of Fig. 10 may be attributed in part to the fact that the "thermoplastic fusion process" of the present invention ensures a bond covering the entire surface area between the parts, whereas, in the "standard" construction, the area actually bonded comprised but a few spaced points or "spots" adjacent which the magnetic material ("Alnico") had become crystallized (by reason of normal exposure to the welding temperatures).

Referring now to Fig. 11, known methods of affixing knobs, hubs, gears, pulleys, drums, etc., to shafts, are costly whether installed by a force fit (in which case the tolerances are necessarily small) or by means of screws or other elements requiring drilled and tapped holes or other special fabrication of the parts. The present invention may be employed in the mounting of elements of the general type above described simply by applying one of the said bonding materials to the mount (indicated by the shaft 80), to the adjacent surface of the part to be mounted (indicated by the metal hub 82), or, preferably, to both parts, then heating one of said parts (preferably the one which will retain heat the longer), as by conduction, to a temperature sufficiently high to initiate pyrolysis and, finally, fitting the parts together. A force fit is not required. As a matter of fact, extreme accuracy of alignment has been achieved with inaccurately fitted parts when the loose parts were aligned and bonded while retained in an accurate gauge-fit fixture.

The present invention may also be practiced to advantage in the manufacture of composite structures which heretofore have required the use of solder in their assembly. By way of example, referring now to Fig. 12, which shows a phonograph record pressing matrix which is claimed per se in copending application Serial No. 359,175, filed September 30, 1940, in the name of Ernest P. Ruggieri, a soldering operation requiring the application of substantial pressure to the parts has heretofore been required in affixing a backing plate 90 to a phonograph record pressing matrix 92. The principal objection to this standard method of backing matrices is that the plated metal, of which the matrices are formed, is frequently pervious to solder; that is to say, the solder under pressure may penetrate to and spread over the face of the matrix where it hardens and ruins the sound track. The seriousness of this problem is indicated by the fact that, while only the most skilled technicians are employed in the making and backing of such matrices, the average of rejects in commercial production is more than 20%. The application of the present invention to the backing of record-playing matrices has resulted in reducing the number of rejects to less than 5% in commercial production.

In the above connection, it may be noted that previous attempts to solve this problem by the use of press pads constituted of a material which works its way into the minute openings in the plated metal, have not achieved a great degree of success, principally because the said materials, though effective in preventing the exuded solder from spreading over the face of a matrice, cannot entirely prevent localized exudation. Further, the problem of "blisters," due to practical difficulties in the fluxing of the solder, and which result in shattered matrices, are in no wise solved by the use of such special pads.

Referring to Fig. 13, a conventional press 100 having coils 102 in its base 104 through which steam is circulated may be employed in the production of the improved record-pressing matrix above described. In this case, the press is preferably provided with a pair of removable top and bottom plates 106, 108, respectively, between which the matrix backing plate 90, the matrix shell 92, and a pressing pad 94 are assembled upon an upstanding pin 108. As in the previously described embodiments of the invention, the adjacent surfaces to be united (in this case parts 90 and 92) are preferably both provided with thoroughly dry coatings or sheets or films of the bonding material prior to the application of the bonding heat and pressure. The bonding force, which is applied by bringing down the head of the press on the assembled stack, should preferably, but not necessarily, be of the same general order of intensity (in this case 1800 lbs. per square inch) as that to which the completed matrix will be subjected during normal operation (i. e., in the molding of records). This practice of applying a bonding force of an intensity greater than that ordinarily necessary to form a good bond is recommended in the production of all composite pressing and stamping tools.

The invention is not limited to the production of composite structures formed of materials and/or similar or dissimilar parts formerly requiring the use of mechanical clamps, or solid embedments, or solder or welds in their assembly, but is also applicable to the bonding of parts heretofore joined by sintering (as in the case of structures constituted in part of "powdered metal," such, for example, as antifriction bearings, etc.), and other "fusion" and "compression" processes.

Various modifications and numerous other applications of the invention will suggest themselves to those skilled in the art. Accordingly, it is to be understood that the foregoing is to be interpreted as illustrative and not in a limiting sense except as required by the prior art and by the spirit of the appended claims.

What is claimed is:

1. Method of uniting parts into a composite structure which comprises placing a thermoplastic synthetic resinous material between said parts, subjecting said parts to pressure, and heating said thermoplastic material to partial pyrolysis while under pressure.

2. Method of manufacturing a composite metallic structure which comprises coating the parts thereof with a thermoplastic solution of a vinyl resin, drying said coating, assembling the coated parts, subjecting the assembly to a temperature sufficient to scorch said coating material while the heated assembly is under pressure, and then cooling the same while under pressure.

3. The invention as set forth in claim 2 and wherein the pressure to which the assembly is subjected is sufficient to cause said coating material to penetrate the adjacent surfaces of the metal parts.

4. Method of manufacturing a laminated metallic structure which comprises fabricating the metal laminae in the ultimate desired contour of the finished structure, applying a relatively thin coating of a thermoplastic synthetic resinous material between the laminae, drying and then stacking said coated laminae, subjecting said stack to heat of an intensity greatly in excess of that required to render said thermoplastic material fluid yet not so great so as to cause complete pyrolysis of said material, subjecting the said stack to pressure while being heated, applying a clamping force of similar intensity to the compressed stack, and then permitting the stack to cool while subject to said clamping force.

5. As a new article of manufacture, a composite structure comprising a plurality of metal parts intimately bonded one to another with a scorched thermoplastic synthetic resinous bonding material.

6. The invention as set forth in claim 5 wherein said scorched thermoplastic material constitutes the sole bond between said metal layers.

7. As a new article of manufacture, a magnetic structure comprising a plurality of preformed metal plates of similar size and duplicate contour, and means comprising a scorched intermediate layer of a thermoplastic synthetic resin for maintaining said metal plates in permanent bonded alignment.

8. The method of bonding metal to metal which comprises providing the metal surfaces to be bonded with a dry layer of a synthetic resinous thermoplastic bonding material, assembling said surfaces, and then subjecting said dry layer of bonding material to pressure and to a temperature greatly in excess of that required to render said material fluid yet not so great as to cause complete pyrolysis thereof.

9. Method of bonding metal to metal which comprises covering the metal surfaces to be bonded with a synthetic resinous material selected from that group of colorless thermoplastics comprising polyvinyl acetate, hydrolyzed polyvinyl acetate and glycerine phthalate, assembling said surfaces, and then subjecting said thermoplastic material to a temperature sufficient to endow said material with a brownish hue.

10. As a new article of manufacture, a composite structure formed of a plurality of metallic parts united by an interposed bonding layer constituted essentially of a scorched thermoplastic synthetic resinous material, said composite structure having the "ring" of solid metal and possessing strength comparable to that achieved by actual fusion of the surfaces of its parts.

11. As a new article of manufacture, a laminated magnetic structure comprising a plurality of magnetic laminae intimately bonded one to another by means of an interposed layer of a scorched synthetic thermoplastic resin, said structure being characterized by its great physical strength and by its high resistance to eddy current losses.

12. A laminated metal body comprising a plurality of metal sheets bonded face to face by an adhesive comprising a thermoplastic vinyl resin, said bond being of sufficient strength to permit the body to be milled, threaded and turned in a lathe in a manner similar to a solid body of metal.

13. A machined metal object comprising a laminated body in which a pile of metal laminae are bonded face to face by a thermoplastic vinyl resin, said bond being of sufficient strength to permit the body to be milled, threaded and turned in a lathe in a manner similar to a solid body of metal.

14. In an electrical device, a machined magnetic member comprising a laminated body of magnetic metal sheets which are bonded face to face by a thermoplastic vinyl resin, said bond being of sufficient strength to permit the body to be milled, threaded and turned in a lathe in a manner similar to a solid body of metal.

15. A laminated metal body comprising a plurality of metal sheets bonded face to face by an adhesive comprising a thermoplastic vinyl resin, said bond being of sufficient strength to permit the body to be subjected to mechanical forces of an intensity sufficient to sever parts of said body from each other without destroying said bond whereby said laminated body reacts to said mechanical forces in a manner similar to a solid body of metal.

16. A machineable metal object comprising a laminated body in which a pile of metal laminae are bonded face to face by a thermoplastic vinyl resin, said bond being of a sufficient strength to permit the body to be subjected to mechanical forces of an intensity sufficient to sever parts of said body from each other without destroying said bond whereby said laminated body reacts to said mechanical forces in a manner similar to a solid body of metal.

17. In an electrical device, a machineable magnetic member comprising a laminated body of magnetic metal sheets which are bonded face to face by thermoplastic vinyl resin, said bond being of sufficient strength to permit the body to be subjected to mechanical forces of an intensity sufficient to sever parts of said body from each other without destroying said bond whereby said laminated body reacts to said mechanical forces in a manner similar to a solid body of metal.

18. A laminated metal body comprising a plurality of metal sheets bonded face to face by an adhesive comprising a thermoplastic vinyl resin, said bond being of sufficient strength to permit the body to be milled, threaded and turned in a lathe in a manner similar to a solid body of metal, said bond being effected by applying pressure to the said sheets while said resin is in a state of partial pyrolysis.

19. In an electrical device, a machined magnetic member comprising a laminated body of magnetic metal sheets which are bonded face to face by a thermoplastic vinyl resin, said bond being of sufficient strength to permit the body to be milled, threaded and turned in a lathe in a manner similar to a solid body of metal, said bond being effected by applying pressure to the said sheets while said resin is in a state of partial pyrolysis.

GREGORY W. BLESSING.

REFERENCES CITED

The following references are of record in the file of this patent:

UNITED STATES PATENTS

| Number | Name | Date |
| --- | --- | --- |
| 1,835,619 | Walsh et al. | Dec. 8, 1931 |
| 2,060,035 | Chaney et al. | Nov. 10, 1936 |
| 1,315,936 | Apple | Sept. 16, 1919 |
| 2,129,478 | Rohm | Sept. 6, 1938 |
| 2,149,732 | Groff | Mar. 7, 1939 |
| Re. 16,201 | Guay | Nov. 3, 1925 |
| 1,453,726 | Prouty | May 1, 1923 |